Nov. 30, 1943.  V. L. HOWARD  2,335,759
CAMERA
Filed Aug. 22, 1939   4 Sheets-Sheet 1
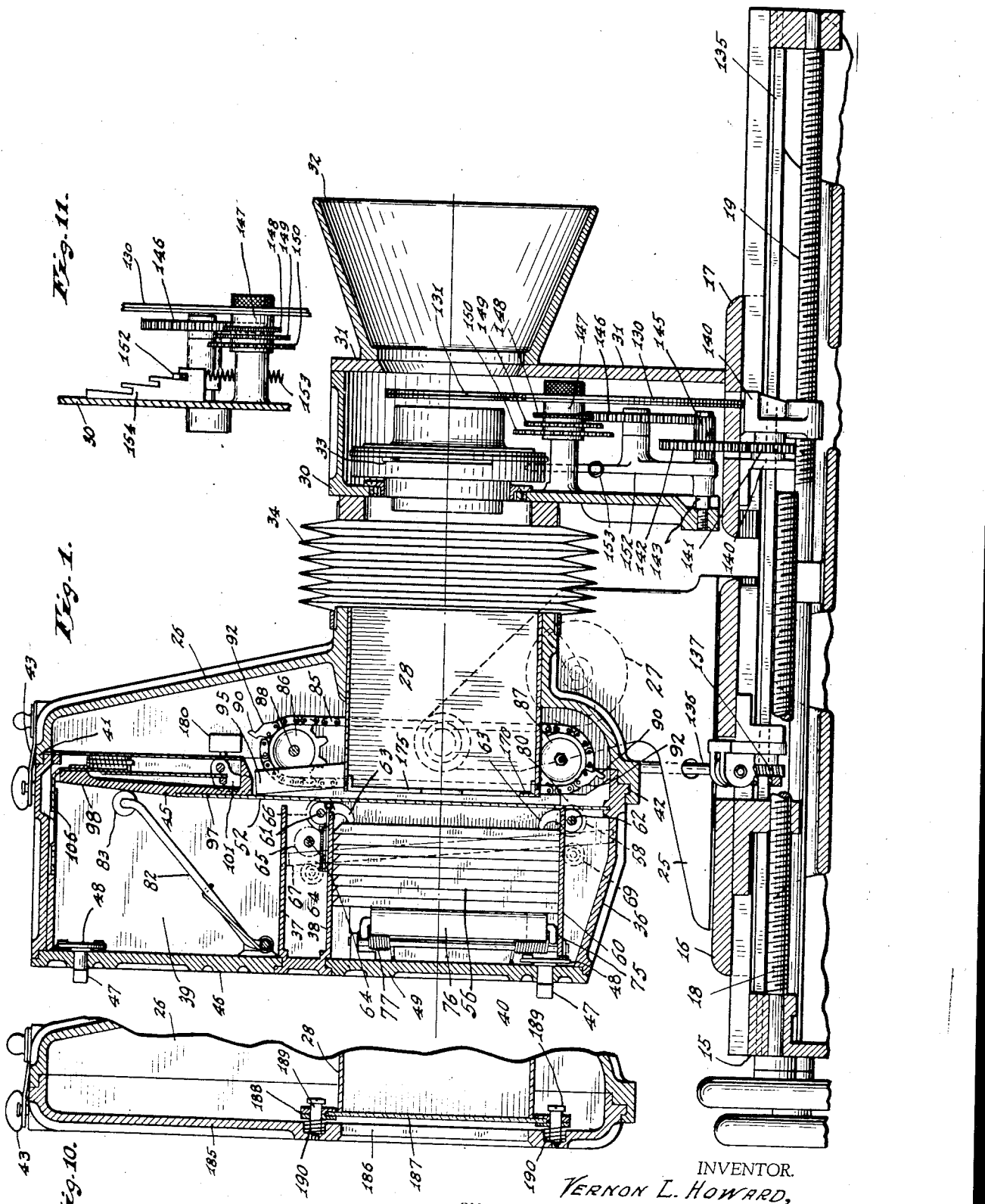
INVENTOR.
VERNON L. HOWARD,
BY
ATTORNEYS.

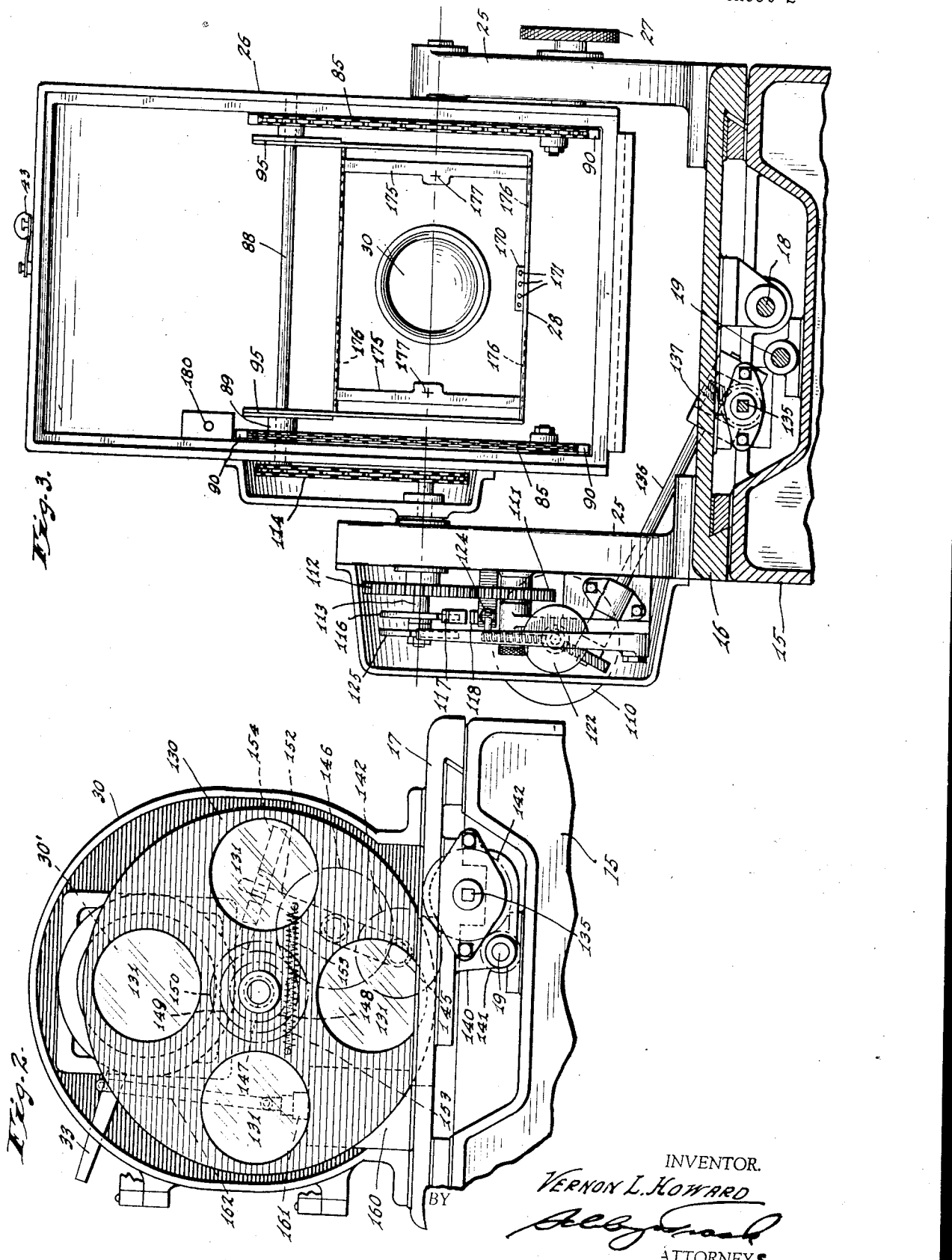

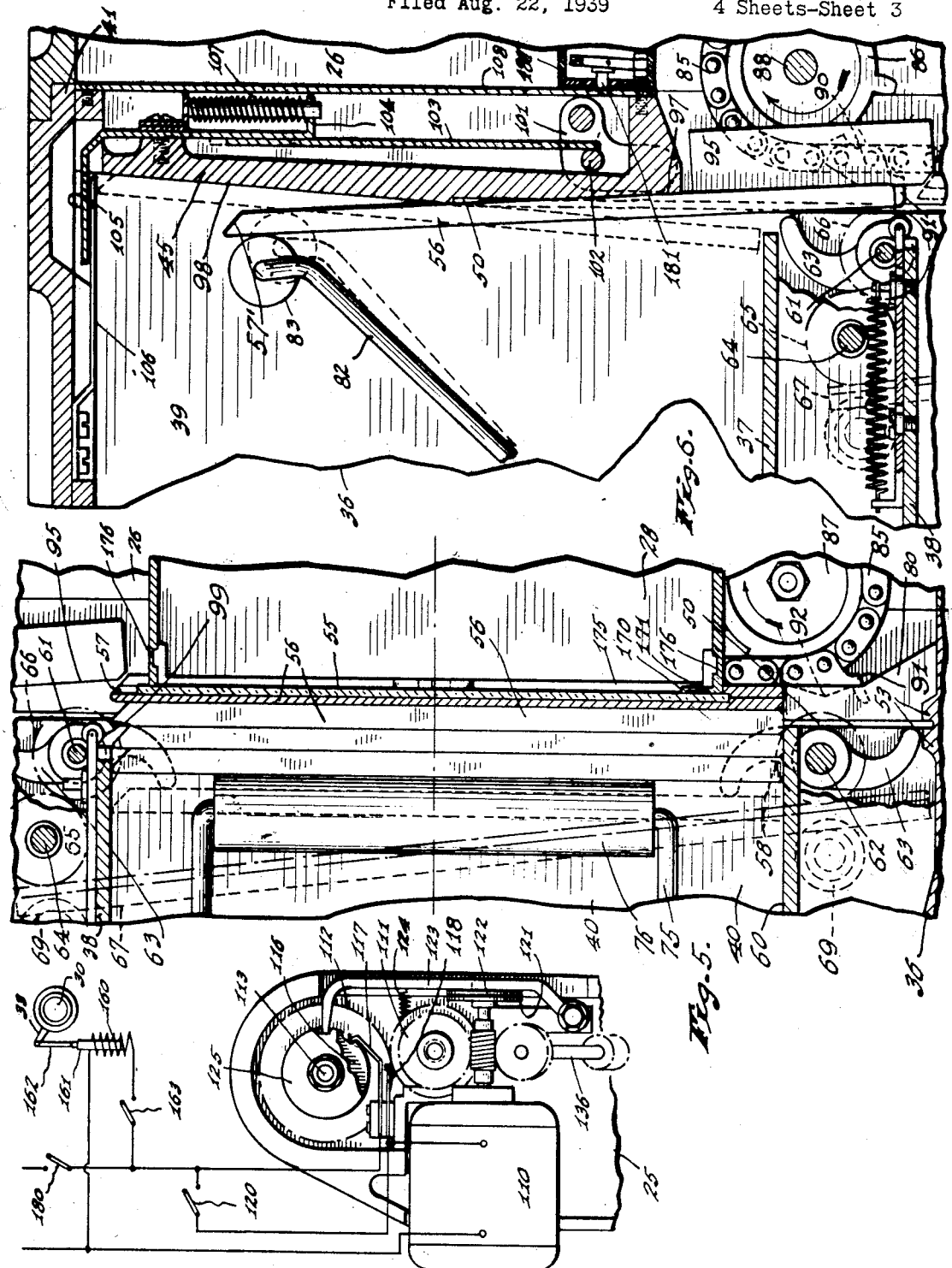

Nov. 30, 1943.   V. L. HOWARD   2,335,759
CAMERA
Filed Aug. 22, 1939   4 Sheets-Sheet 4
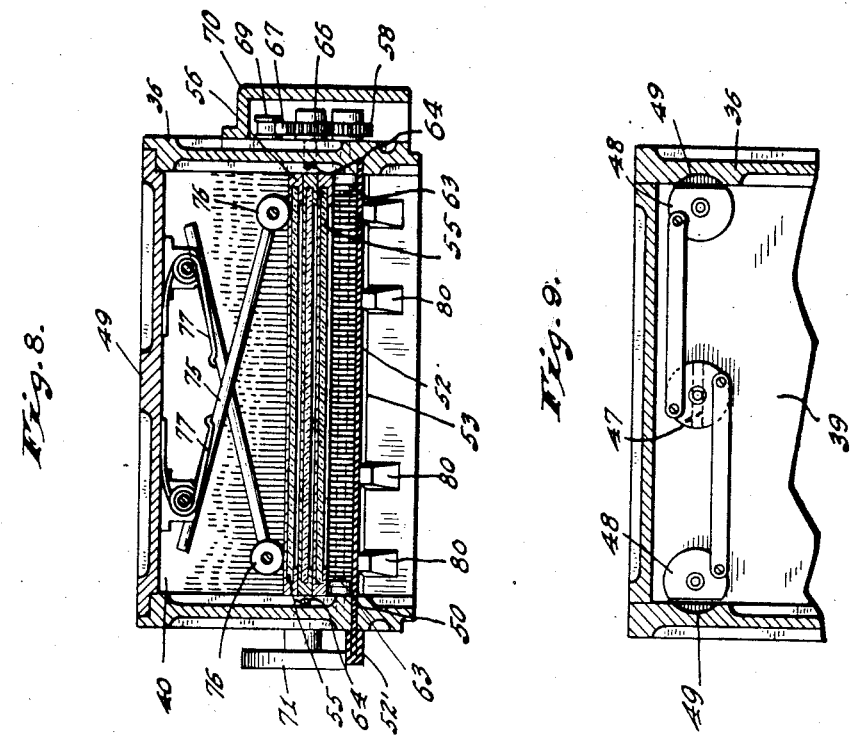
INVENTOR.
Vernon L. Howard,
BY
ATTORNEYS.

Patented Nov. 30, 1943

2,335,759

UNITED STATES PATENT OFFICE 2,335,759

CAMERA

Vernon L. Howard, Indianapolis, Ind.

Application August 22, 1939, Serial No. 291,346

10 Claims. (Cl. 95—2)

My invention is primarily concerned with the production of a camera for use in exposing photographic plates or other photo-sensitive elements to be used in the production of printing plates for making multi-color reproductions. As is well known, each of such printing plates is produced from a photographic plate which has been exposed to filtered light of a color coordinated with that of the ink which is to be used with that particular printing plate; so that a set of photographic plates (called color separation plates) for use in producing a set of printing plates will include at least as many plates as there are printing steps in the reproduction process.

Among the objects of my invention are to produce a camera in which a set of color separation plates can be quickly and simply exposed; to insure that the respective exposure positions of the several plates in the set will be the same in respect to the focal plane of the camera in order to obtain the necessary registry of the several impressions in the printing process; to produce a camera in which the number of plates exposed in each set may be varied; to embody in the camera means by which each plate will bear indicia identifying the color of light to which it has been exposed; to provide a camera of the type referred to with a removable magazine capable of being removed from the camera after any desired number of exposures have been made; and to move the plates successively into and out of exposure position with a minimum of vibration.

In carrying out my objects, I provide the camera with a removable magazine having two compartments, one for unexposed plates and the other for exposed plates, and I arrange in the camera means for successively moving the plates from the first compartment to the second. Each plate is carried in a plate holder open on one face to expose the emulsion side of the plate; and the camera includes a support which engages the emulsion side of the plate and holds it in proper position for exposure. Associated with the camera lens I provide a filter carrier carrying an endless, preferably annular, series of color filters, and I provide means for moving such filter carrier in timed relation with the plate-shifting mechanism, such means being adjustable to vary the extent of the filter-carrier movement which occurs at each plate-shifting operation. Within the camera I mount immediately in front of each plate in exposure position and desirably along one edge of such plate a series of small color filters respectively corresponding in color to the filters in the aforesaid carrier.

The accompanying drawings illustrate my invention: Fig. 1 is a vertical axial section through a camera embodying my invention; Fig. 2 is a front elevation of the camera with the cover plate for the filter-moving mechanism removed; Fig. 3 is a rear elevation of the camera, in partial section, with the plate magazine removed; Fig. 4 is a fragmental side elevation illustrating the driving motor and certain details of the plate-moving mechanism; Figs. 5 and 6 are fragmental sections similar to Fig. 1 but on an enlarged scale; Fig. 7 is a front elevation of the plate magazine; Fig. 8 is a horizontal section on the line 8—8 of Fig. 7; Fig. 9 is a fragmental section illustrating details of the lock by which the cover of each magazine compartment is held in place; Fig. 10 is a fragmental section similar to Fig. 1 illustrating a preferred form of ground-glass support in position on the camera; and Fig. 11 is a plan view of a portion of the means employed for moving the filter-carrier.

The camera shown in the drawings includes a base 15 which, in practice, is mounted on a suitable support to provide for its vertical and angular adjustment. As such supports are common in studio cameras and as my invention is in no way concerned with details of the support, I have eliminated from the drawings any showing of means supporting the base 15.

The base 15 is provided with longitudinally extending guide ways upon which are slidably mounted a rear carriage 16 and a front carriage 17, the former being movable along its associated guide ways by rotation of a manually operable adjusting screw 18 and the latter by operation of a second manually operable adjusting screw 19. As will be apparent from the more detailed description to follow, the rear carriage 16 supports the plate magazine and plate-moving mechanism, while the front carriage 17 supports the lens, shutter, and filter carrier.

The carriage 17 is provided with two laterally spaced upwardly extending arms 25 between which there is supported a housing 26. If desired, the housing 26 may be mounted in the arms 25 to swing about a horizontal transverse axis in order to vary the angle between the lens-axis and a plate to be exposed. If the housing 26 is pivotally mounted as indicated in the drawings, means such as the clamp screw 27 is provided for holding it in fixed angular position. Within the housing 26, I mount a sleeve 28 the cross-sectional dimensions of which correspond to the dimensions of the plates to be exposed in the camera. During exposure, each plate is supported upon the rear end of this sleeve in fixed position relative to the carriage 16.

The front carriage 17 supports a housing 30 for the lens and filters, such housing having a removable front cover 31 which may, if desired, carry a light-shield 32. Inside the housing 30 I mount a camera lens 30', a shutter, and a shutter-operating mechanism, the latter including an operating lever 33. The rear housing 26 and the lens-housing 30 are interconnected by a light-proof, extensible bellows 34.

The rear end of the rear housing 26 is open and is adapted for the reception of the plate magazine. The plate magazine consists of a box-like structure 36 provided intermediate its height with a pair of horizontally spaced partitions 37 and 38, the former defining the bottom of a compartment 39 for exposed plates and the latter defining the top of a compartment 40 for unexposed plates. Desirably, the magazine 36 and the housing 26 are provided with interfitting light-tight provisions for locating the magazine in definite position on the housing. As shown, the front face of the magazine 36 is provided with a forwardly projecting peripheral flange received in a rabbet groove extending around the edges of the open rear face of the housing 26. In addition, the magazine 36 may be provided along its bottom edge with a downwardly projecting flange 42 which is received in a correspondingly shaped groove on the housing 26. A releasable latch 43 at the top of the housing and magazine serves to hold the latter in position.

The inner or forward end of the compartment 39 is closed by an end plate 45 which extends downwardly from the top wall of the magazine and terminates short of the upper partition 37. The rear end of the compartment 39 is closed by a removable cover plate 46 held in place by releasable latch mechanism (see Fig. 9) including a rotatable handle 47 operatively connected to latch members 48 engageable in suitably located recesses 49 in the side walls of the magazine 36. A similar cover plate 49 closes the rear end of the compartment 40. The side walls of the plate magazine 36 are slotted, as indicated at 50 for the reception of an opaque mask 52 which covers the inner end of the lower plate compartment 40 completely and which extends upwardly into overlapping relation with the end wall 45 of the upper compartment. The bottom wall of the magazine 36, in the plane of the slots 50, may be provided with a groove 53 the side walls of which lend additional support to the mask 52 when it is in position.

Each of the plates 55 to be exposed in my camera is first positioned in an individual plate-holder 56 (see Figs. 5 and 8). Each of such plate holders is desirably formed of sheet-metal and is provided along its bottom and vertical edges with a rim 57 grooved on its inner faces for the reception of the plate 55, which may be slid into place through the open upper end of the plate holder, as will be apparent from Fig. 5, with its emulsion side outward.

In charging the magazine, the mask 52 is put in place and the cover 49 removed. One or more sets of plates, each in its individual plate holder, are then placed in superposed relation within the compartment 40, being located therein by the vertical side walls of the magazine, by the partition 38 and by another partition 60 defining the bottom of the compartment 40. I find it desirable to prevent the innermost plate in the compartment 40 from engaging the mask 52, and to this end I mount respectively above the partition 38 and below the partition 60 transversely extending shafts 61 and 62 each of which carries a pair of fingers 63 adapted to engage the innermost plate-holder 56 at the sides of the plate therein. Between the partitions 37 and 38 I dispose a shaft 64 carrying a pinion 65 which meshes with a pinion 66 on the shaft 61 and also with a rack 67 which, in turn, meshes with a pinion 58 on the shaft 62. The rack 67 may be held in engagement with the pinions 65 and 68 by means of rollers 69 which, together with the rack and the pinions 65, 66, and 68, are disposed at one side of the magazine 36 and enclosed in a suitable housing 70, as indicated in Fig. 8.

At one end, the shaft 64 carries an operating knob 71 by means of which the fingers 63 can be moved between the full-line and dotted-line positions shown in Fig. 5. When in the dotted-line position shown, the fingers engage the innermost plate-carrier 55 and hold it in rearwardly spaced relation to the slots 50 in which the mask 52 is received; while, when in the full-line position, the fingers 63 lie beyond the limits of the plate-holders and do not interfere with movement thereof. Desirably, the operating knob 71 has a flat side which, when the fingers 63 are in the position shown in dotted lines in Fig. 5 and in full lines in Fig. 1, is disposed adjacent a reinforcement 52' on the mask 52, the relationship of the knob and mask-reinforcement being such that when the mask is in position the knob 71 can not be rotated to move the finger 63 to retracted position and such that the mask can not be inserted until the knob has been so positioned that the fingers 63 will engage the innermost plate-holder 55 and move it away from the mask-receiving slots 50.

The cover 49 for the rear plate-compartment 40 carries means which acts on the plates in such compartment and tends to force them forwardly. This means conveniently takes the form of a pair of U-shaped yokes 75 pivotally mounted on opposite sides of the cover 49, disposed in crossed relation, and provided with rollers 76 engaging the back of the rearmost plate-holder 55. Springs 77 or other suitable yielding means tend to swing the yokes 75 about their respective axes of pivotal mounting in such a direction that the rollers 76 will exert a forwardly directed force on the rearmost plate-holder. When the magazine 36 is not in position on the camera, the mask 52 will be in place, the fingers 63 of the plate-retracting mechanism will be in the position shown in dotted lines in Fig. 5 and in full lines in Figs. 1 and 7. The pressure exerted on the plates in the compartment 40 by the rollers 76 will tend to swing the fingers 63 toward retracted position, but such movement of the fingers will be prevented by engagement of the flat side of the knob 71 with the mask-reinforcement 52'.

When the magazine is put in place on the housing 26, the knob 71 is rotated slightly to release it from engagement with the mask-reinforcement 52', the mask is then withdrawn, and the knob permitted to rotate until the fingers 63 are retracted, whereupon the spring-pressed rollers 76 will force the plate holders forwardly until the plate 55 in the innermost plate holder is seated on the rear end of the sleeve 28 as shown in Fig. 5. In this position, the innermost plate holder lies inwardly beyond the partition 60, which previously supported it, and I therefore provide the magazine 36 with a series of upwardly projecting legs 80 the upper surfaces of which are co-planar with the upper surface of the partition 60. The legs 80, as is clear from Fig. 5, are disposed ahead of the mask-receiving slots 53, so as not to interfere with insertion and removal of the mask.

The cover 46 for the rear end of the upper plate-compartment 39 has mounted upon it a yoke 82 similar to the yokes 75 previously described and bearing upon its free end a roller 83 engaging the back of the outermost plate-holder in the compartment 39. For a purpose which will hereinafter become apparent, the yoke 82 is pivoted to the cover 46 on a horizontal axis located near the lower edge of such cover, and the roller 83 traverses a path nearer the top than the bottom of the compartment 39.

The means shown in the drawings for moving each plate from exposure position on the rear end of the sleeve 28 into the upper plate compartment 39 of the magazine comprises a pair of endless chains 85 which are mounted within the housing 26 on opposite sides of the sleeve 28. Each of these chains extends between an upper sprocket 86 and a lower sprocket 87, the upper sprockets being rigidly mounted on a horizontal shaft 88 which extends across the housing 26 above the sleeve 28. The lower sprockets 87 may be idler sprockets mounted on individual stub-shafts extending inwardly from the side wall of the housing 26 below the sleeve 28.

Each chain 85 carries a pair of equally spaced lugs 90 arranged to engage the lower edge of a plate holder in exposed position at the rear end of the sleeve 28. Each of the lugs 90 is shaped as indicated in Fig. 5, being formed at its rear with an outwardly extending finger 91 and at its front with an inwardly and forwardly extending cam surface 92.

Between successive plate-changing operations of the plate-shifting mechanism, the lugs 90 on each chain occupy respective positions near the top and bottom of the chain. When the shaft 88 is rotated, however, the lower lug 90 moves rearwardly and upwardly around the periphery of the sprocket 87, the inclined cam surface 92 engages the lower edge of the plate holder 55 which is in exposure position, and moves the lower edge of such plate holder rearwardly until the rim 57 thereon clears the rear end of the sleeve 28. Immediately thereafter, the finger 91 engages the lower edge of the plate holder and moves it upwardly to carry it out of exposure position and into the exposed plate-compartment 39 of the magazine.

In order to prevent the emulsion side of the plate from scraping over the upper portion of the sleeve 28 as the plate is raised. I mount within the housing 26 a pair of guides 95 which are positioned to engage the rim 57 of the plate holder at the sides of the plate 55 and the rear faces of which slope rearwardly and upwardly. The guides 95 are disposed, as is clear from Fig. 5, to engage the plate-holder rim 57 immediately after upward movement of the plate holder has begun; and the inclination of the rear faces of the guides carries the upper edge of the plate holder rearwardly and moves the plate clear of the rear end of the sleeve 28. The upper ends of the plate-holder rim 57 may be beveled, as indicated at 57', to facilitate their engagement with the guides 95.

The plate holders successively moved upwardly from exposure position at the rear end of the sleeve 28 enter the upper magazine compartment 39 through the gap between the partition 37 and the inner end wall 45 of such compartment. The inner surface of the end wall 45 is shaped as indicated in Fig. 6—i. e., its lower portion 97 slopes downwardly and forwardly and its upper portion 98 slopes upwardly and forwardly, the lower portion, when the magazine is in position on the housing 26, being substantially co-planar with the rear faces of the guides 95.

As the first plate holder is moved upwardly by the upwardly moving fingers 91 on the lugs 90, its leading edge passes across the portion 97 of the end wall of the compartment 39 and beyond such portion until the plate holder engages the roller 83 on the yoke 82 and forces such yoke rearwardly as indicated by the full-line showing in Fig. 6. Thereafter, the roller 83 exerts a forwardly directed force on the upper portion of the plate holder and tends to swing it into contact with the wall-portion 98; but such swinging movement of the plate holder, which would carry its lower edge out of engagement with the finger 91, is prevented until after the plate holder has cleared the partitions 37 and 38. For the purpose of reducing friction, one of such partitions, here shown as the partition 38, may be provided with one or more rollers 99 which are yieldingly urged forwardly, to engage the upwardly moving plate holder. As soon as the plate holder clears the upper partition 37, it is free to swing into contact with the wall portion 98 under the influence of the pressure exerted upon it by the roller 83. As a result of this swinging movement, the lower portion of the plate holder is separated from the lower wall-portion 97 to provide a space into which the next plate received in the compartment 39 may enter. The position of the first plate-holder upon completion of its movement into the compartment 39 is shown in dotted lines in Fig. 6.

I may, in certain instances, find it desirable to provide means for positively insuring that the plate holders in the magazine compartment 39 will be moved into positions which will not interfere with the entry of the next plate holder. Such a means is illustrated in Figs. 6 and 7, and comprises a pair of swinging members 101 which are pivotally mounted adjacent the inner surfaces of the side walls of the magazine compartment 39 near the lower edge of the wall 45. The two swinging members are interconnected by a rod 102 to which is attached a plate 103 which extends upwardly along the forward side of the wall 45 and has its upper end secured to a vertically sliding member 104. The upper end of the sliding member 104 is bent to extend over the upper edge of the wall 45 and inwardly of the compartment 39, as indicated at 105, immediately above the free end of a leaf spring 106 which, when unstressed, is approximately flush with the inner surface of the upper wall of the magazine 36, as indicated in Fig. 6.

Should any plate holder deposited in the magazine compartment 39 not be moved into the position indicated in dotted lines in Fig. 6 by the action of the roller 83 but instead occupy a position such that its lower edge was in the path of the next plate holder entering the compartment, such entering plate holder would strike the lower edge of the first plate holder and move it upwardly. Upward movement of the first plate holder would displace upwardly the spring 106, the sliding member 104, and the plate 103, and would thereby cause the members 101 to swing about their axis of pivotal mounting and to force the lower edge of the first plate holder rearwardly to make room for the plate holder entering the compartment. A spring 107, acting between the slidable member 104 and a stationary abutment, may be employed to restore the swinging members 101 to a position out of the path of movement of plate-holders entering the magazine compartment 39 as soon as upward pressure on the leaf spring 106 is relieved. A plate 108 secured in spaced relation to the wall 45 covers and protects the mechanism just described.

Desirably, the plate-moving mechanism above described is power-driven. To this end, I may mount on the outer side of one of the legs 25 an electric motor 110 connected through speed-reducing gearing 111—1112 to a shaft 113. If, as is the case in the drawings, the housing 26 is tiltable relatively to the legs 25, the shaft 113 is disposed co-axially with the trunnions by which the housing 26 is supported, the shaft 113 extending through the adjacent trunnion and being connected, as through the chain drive 114 illustrated, to the shaft 88 of the plate-moving mechanism within the housing 26. The chains 85 are made of such length that adjustment of the housing 26 about its axis of pivotal mounting in the legs 25 will not bring the lugs 90 into engagement with a plate holder at the rear end of the sleeve 28.

I find it convenient to control operation of the motor 110 automatically, at least to an extent such that a plate-shifting operation, when once instituted, will be carried to completion. In carrying out this purpose, I may make the chain drive 114 of such a speed-ratio that one complete rotation of the shaft 113 will effect a complete plate-changing operation of the chains 85; and on the shaft 113 I mount a cam 116 which cooperates with a pair of contacts 117 and 118 connected in the circuit of the electric motor 110. As shown in Fig. 4, the contact 117 has an extension the end of which is receivable in a notch in the periphery of the cam 116. Normally, the contacts 117 and 118 are open, the extension of the former occupying the notch in the cam 116. If, in these circumstances, current is supplied to the motor 110, as by a momentary closing of a switch 120 bridging the contacts 117 and 118, the motor will drive the shaft 113. As this shaft 113 begins to rotate, the notch in the cam 116 moves out of association with the contact 117 to force the latter into engagement with the contact 118 and to maintain the motor circuit closed until a complete revolution of the shaft 113 has again brought the notch in the cam 116 into association with the contact 117 to permit the latter to move out of engagement with the contact 118.

To prevent the momentum of the motor from carrying the plate-shifting mechanism beyond the point at which the end of the contact 117 is disposed in the notch of the cam 116, I may employ the automatic brake means illustrated in Figs. 3 and 4. As shown, this brake comprises a pair of co-operating members in the form of disks 121 and 122. The disk 121 is mounted on one end of the shaft of the motor 110, while the disk 122 is rigidly mounted in opposed relation on a swinging lever 123 which is urged by a spring 124 in a direction tending to cause engagement of the two brake-disks. The free end of the lever 123 co-operates with a notched disk 125 on the shaft 113, the arrangement being such that the lever-end will occupy the notch in the disk 125 when the contact 117 occupies the notch in the disk 116. During the interval in which the contacts 117 and 118 are maintained closed by the disk 116, the disk 125 holds the lever 123 against the action of the spring 124 in such a position that the brake disks 121 and 122 are out of contact with each other; but, when the end of the contact 117 enters the notch in the disk 116 to open the motor circuit, the notch in the disk 125 comes into alinement with the free end of the lever 123 and permits the spring 124 to move such lever and to cause engagement of the brake 121—122 to bring the motor to a stop.

The filter of the camera shown in the drawings are mounted at equal angular intervals in a rotatable disk 130 supported within the housing 30 on the carriage 17. The filter carrier 130 is mounted for rotation about a horizontal axis spaced from the camera lens in such a position that the filters on the carrier may be successively brought into alinement with the camera lens.

The number of filters may vary, depending upon the number of color separation plates in each set. In producing plates for a three-color process, there will be three plates 55 in each set and, ordinarily, three filters (red, green, and blue) in the filter carrier 130. In the case of a four-color process, there will be four plates 55 in each set and, ordinarily, four filters (red, green, blue, and color-corrective) in the filter carrier. In producing photographic plates for either the three-color of four-color printing process, however, it may be desirable to prepare an additional full-color photographic plate. In that event, such a plate would be included in each set of plates, and the filter-carrier 130 would have an extra opening which might be filterless or which might have mounted within it a filter adapted to correct for the character of the light to which the subject is exposed.

Desirably, means is provided for automatically changing the position of the filter carrier at each operation of the plate-shifting mechanism. To this end, I mount in the base 15 a longitudinally extending shaft 135 of non-circular cross-section which is driven from the motor 110 and which, in turn, rotates the filter carrier 130. As shown in the drawings, the means for driving the shaft 135 takes the form of an inclined shaft 136 which is driven from the motor 110 and which, in turn, drives a gear 137. The gear 137 is rotatable with the shaft 135 but is supported axially from the carriage 16 so as to be movable therewith.

The front carriage 17 is provided with a pair of downwardly extending spaced abutments 140 between which there is disposed a pinion 141 slidable on the shaft 135 but rotatable therewith. The pinion 141 meshes with a gear 142 which is rotatably mounted on a stub shaft 143 projecting forwardly from the rear wall of the housing 30. The gear 142 is rigid with a pinion 145 meshing with a gear 146 which in turn meshes with a gear on a rotatable sleeve 147 to which the filter disk 130 is removably secured.

In order to accommodate the camera to the use of filter carriers 130 carrying different numbers of filters, I mount on the sleeve 147 three gears 148, 149, and 150 of different sizes, and I make the gear 146 adjustable so that it may be brought into meshing engagement with any of the gears on the sleeve. The gear 146 is rotatably supported from an intermediate point on a lever 152 which is pivotally and slidably mounted on the stub shaft 143. A spring 153 acting upon the lever 152 tends to move it in a direction to cause engagement of the gear 146 with that gear on the sleeve 147 with which it is alined. To hold the lever 152 in each of its several positions of adjustment, I mount within the casing 30 a stationary plate 154 (see Fig. 11) which has along its outer edge a series of notches spaced both axially and angularly with relation to the stub shaft 143, each of such notches being adapted to receive the upper end of the lever 152.

It will be obvious from the above description that for each plate-changing operation of the plate-shifting mechanism the shaft 135 will rotate through a fixed distance and will rotate the filter carrier 146 through a predetermined angle depending upon the gear-ratio of the operative connection between the shaft 135 and the sleeve 147. This gear ratio may be varied by selectively positioning the lever 152 to bring the gear 146 into engagement with the desired one of the gears 148, 149, and 150. In Fig. 1, I have shown the gear 146 in engagement with the smaller gear 148, which would be the arrangement employed for a filter carrier bearing three filters, and the filter carrier would be rotated through 120° at each plate-shifting operation. If the filter disk 130 carries four filters, as indicated in Fig. 2, the lever 152 will be moved to bring the idler gear 146 into mesh with the gear 149 of intermediate size, and the filter carrier will rotate through 90° at each operation of the plate-shifting mechanism. Similarly, if the filter carrier bears five filters, the lever 152 will be operated to bring the gear 146 into mesh with the largest gear 150, and the filter carrier will therefore rotate through 72° at each operation of the plate-shifting mechanism. Desirably, I provide a remote control for the shutter-operating mechanism of the camera. For this purpose, I may disposed in the housing 30 a solenoid 160 having a movable core 161 which is connected through a link 162 with the operating lever 33 of the shutter. The solenoid 160 (see Fig. 4) is connected to a source of current through a switch 163. Desirably, the switches 120 and 163 are push-button switches and are arranged in a single unit connected with the devices they respectively control by a three-wire cable.

Within the sleeve 28 at the rear end thereof, I provide an inwardly directed flange 170 which carries a series of filters 171 corresponding respectively in color to the filters employed in the filter carrier 130 when the camera is being used to produce a set of color separation plates for use in a four-color process. That is, the four filters 171 will consist of a red filter, a green filter, a blue filter, and a color-corrective filter. The filters 171 are shown as arranged in a straight line, but other arrangements may be used if desired. When any filter 131 of fundamental color is associated with the camera lens, light will pass substantially unimpeded through the filter 171 corresponding in color to that filter 131; a portion of the light passed by the filter 131 in association with the lens will also pass through the color-corrective filter 171; but very little light will pass through the other two filters 171. As a result, if either the red, the green, or the blue filter 131 is in alinement with the camera lens, the image of the corresponding colored filter 171 and the image of the color-corrective filter 171 will print on the plate, the former printing more deeply than the latter. If the color-corrective filter is disposed at one end of the row of filters 171, the distance between its image and the other image printed on the plate will indicate the color of the filter which was in alinement with the camera lens when that plate was exposed. The plate exposed to light passing the color-corrective filter 131 will pass substantially unimpeded through the color-corrective filter 171, but only portions of such light will pass through the other three filters. As a result, the plate exposed to light passing the color-corrective filter will display four images, three of which will be of relatively weak intensity and the other of which will be substantially deeper. From the images of the filters 171 as printed on any plate, it is therefore possible to determine quickly the color of the light to which that plate was exposed.

In order to facilitate registry of the several different colored impressions in the printing process, it is customary to provide register marks on the plates. For this purpose I mount at the rear end of the sleeve 28 a pair of horizontally slidable members 175. These members extend vertically across the rear end of the sleeve 28 and are slidably adjustable toward and away from each other, as by having their ends disposed in grooves 176 cut in the inner surfaces of the top and bottom walls of the sleeve 28. Near its center each of the members 175 is provided with two fine intersecting slits 177 which will print in the form of a cross on each plate, and which will facilitate the operation of securing registry. The purpose of making the members 175 adjustable is to dispose the cross slits 177 as close as possible to the sides of the image which is to be reproduced, thus making it unnecessary unduly to enlarge the printing plates in order that the registry marks may show thereon.

I find it desirable in many instances to provide means which will prevent accidental operation of the plate-changing mechanism and filter-moving mechanism at times when the magazine 36 is not in place. This means may take the form of a switch 180 disposed within the housing 26 and having an operating member 181 positioned to be engaged by some portion of the magazine, such as the plate 108, when the magazine is in place on the housing 26 and, by reason of such engagement, to maintain the switch 180 closed. The switch 180, if provided, is connected in one of the supply wires between the source of current and the switches 120 and 163, as is clear from Fig. 4.

In Fig. 10 I have illustrated a convenient means for supporting a ground glass at the end of the sleeve 27 when the subject to be photographed is being arranged and the camera adjusted. This means takes the form of a cover 185 which fits on the rear end of the housing 26 in the same manner as does the magazine 36, and which is adapted to be held in place by the latch 43. In line with the sleeve 28, the cover 185 has a sight opening 186, and between this sight opening and the rear end of the sleeve 28 there is disposed a ground glass 187 mounted in a frame 188 which is supported from the cover 185 on guide posts 189 and yieldingly urged forwardly of the camera as by means of compression springs 190 embracing such guide posts. By this means of supporting the ground glass 187, I insure that the mat surface thereof, which is at the front and upon which the image appears, will occupy exactly the same position as the emulsion-side of each photographic plate in exposure position.

In the operation of the camera, there is mounted on the sleeve 147 a filter disk 130 bearing the proper number and kind of filters, and the lever 152 is adjusted to arrange the gearing so that the filter disk will make one full revolution for each set of plates to be exposed. The magazine is loaded by placing one or more sets of unexposed color-separation plates in the magazine-compartment 40. Prior to loading the magazine, the knob 71 is turned to put the plate-retracting fingers 63 in the positions illustrated in dotted lines in Fig. 5 and in full lines in Figs. 1 and 7, and the mask 52 is then inserted. When inserted, the mask 52 prevents rotation of the knob 71, and therefore holds the finger 63 in operative position, as above set forth. When the desired number of sets of plates have been placed in the magazine compartment 40, the cover 49 is then secured in place.

The cover 185 is placed upon the housing 26, and the camera and subject arranged to produce the desired image on the ground-glass 187 which, as above indicated, is seated on the rear end of the sleeve 28. Upon removal of the cover 185 from the housing 26, the members 175 may be adjusted so as to occupy positions closely adjacent the sides of the image.

The magazine, loaded with one or more sets of plates as above described, is then positioned on the rear end of the housing 26 and secured in place by the latch 43. This operation closes the switch 180, so that thereafter the plate-changing mechanism and the shutter can be operated as desired under the control of the switches 120 and 163. The mask 52 is then removed, and the knob 71 permitted to rotate under the influence of the pressure exerted upon the plate holders by the rollers 76 until the first plate is seated in exposure position on the rear end of the sleeve 28, as shown in Fig. 5. Thereupon, the switch 63 is closed to open the shutter and maintain it closed for the duration of the desired exposure, whereupon opening of the switch will close the shutter. The switch 120 is then closed momentarily to effect the supply of current to the motor 110, which begins to operate the plate-changing and filter-moving mechanism. Immediately after operation of the motor 110 has begun, the disk 116 closes the contacts 117 and 118 and maintains the motor circuit closed until the shaft 113 has made a complete revolution to effect a plate-changing operation as above described. At the completion of the plate-changing operation, the first plate is within the exposed-plate compartment 39 of the magazine, occupying therein the position indicated in dotted lines in Fig. 6; and the second plate has been moved into exposure position at the rear end of the sleeve 28 as a result of the pressure exerted by the roller 76 on the plate holders in the magazine-compartment 40. The shutter is then again opened by closing the switch 163 to expose the second plate. This sequence of operations is repeated until the full set of plates has been exposed, whereupon the filter carrier will have been restored to its original position.

If any plate in the set of plates is different from the others, as in a process involving the exposure of a full-color plate, it is obviously essential that the filter carrier 130 be disposed in proper position before the first plate is exposed; as otherwise, the full-color plate would be exposed to filtered light. Such preliminary arrangement of the filter-carrier may be effected either by rotating it on the sleeve 147 or by swinging the lever 152 to disengage the gear 146 from the gears on the sleeve 147 and then adjusting the sleeve and filter carrier to proper position, subsequently restoring the lever 152 to proper position.

While I have shown the control switches 120 and 163 as adapted for manual operation, it will be obvious that, by the provision of suitable timing mechanism, the opening and closing of the circuits respectively including the motor 110 and the solenoid 160 might be automatically controlled during the exposure of each full set of plates. Such an automatic control, however, forms no part of the present invention, and therefore need not be described.

It is to be noted that each plate, as exposed, is located in relation to the focal plane of the camera by direct engagement of its emulsion-coated surface with the rear end of the sleeve 28. By this means I ensure that the respective images on all the plates of each set are identically the same in size, which is necessary to secure perfect registry in the printing process. This feature is of considerable importance; for, if a plate in exposure position was located from its rear surface or by locating means engaging the plate-holder, variations in the thickness of the plates, or variations in the plate holders, might cause the several plates in each set to be held in different positions relative to the focal plane of the camera, thus resulting in images of different sizes and making perfect registry of the printing impressions impossible.

After any or all of the sets of plates in the magazine-compartment 30 have been exposed, the knob 71 may be rotated to bring the fingers 63 into the position shown in full lines in Fig. 1, the mask 52 inserted, and the magazine removed from the camera. Upon removal of the cover 46 for the exposed-plate compartment 39, the exposed plates will be available in the order in which they were exposed.

I claim as my invention:

1. In a camera, a housing carrying a lens and shutter mechanism, a plate magazine having a compartment for a series of superposed unexposed plates and a compartment for exposed plates, said magazine being removably associated with said housing, means for holding said magazine in position on the housing with the unexposed-plate compartment coaxial with said lens, yielding means in said unexposed-plate compartment for urging the plates therein forwardly, releasable mechanism in said magazine for holding the unexposed plates retracted against the force exerted upon them by said yielding means, a plate support mounted in the housing in position to engage the emulsion-coated surface of the forwardmost plate in the unexposed-plate compartment to support such plate in exposure position as the unexposed plates are urged forwardly by said yielding means, and means carried by said housing for successively moving plates from exposure position into the exposed-plate compartment of said magazine.

2. In a camera, a housing carrying a lens and shutter mechanism, a plate magazine having a compartment for a series of superposed unexposed plates and a compartment for exposed plates, said magazine being removably associated with said housing, means for holding said magazine in position on the housing with the unexposed-plate compartment coaxial with said lens, yielding means in said unexposed-plate compartment for urging the plates therein forwardly, releasable mechanism in said magazine for holding the unexposed plates retracted against the force exerted upon them by said yielding means, a plate support mounted in the housing in position to engage the forwardmost plate in the unexposed-plate compartment to support such plate in exposure position as the unexposed plates are urged forwardly by said yielding means, and means carried by said housing for successively moving plates from exposure position into the exposed-plate compartment of said magazine.

3. In a camera, a housing carrying a lens and shutter mechanism, a plate magazine having a compartment for a series of superposed unexposed plates and a compartment for exposed plates, said magazine being removably associated with said housing, means for holding said magazine in position on the housing with the unexposed-plate compartment coaxial with said lens, yielding means in said unexposed-plate compartment for urging the plates therein forwardly, a plate support mounted in the housing in position to engage the forwardmost plate in the unexposed-plate compartment to support such plate in exposure position as the unexposed plates are urged forwardly by said yielding means, and means carried by said housing for successively moving plates from exposure position into the exposed-plate compartment of said magazine.

4. The invention set forth in claim 3 with the addition of a filter-carrier movably mounted on said housing and bearing a series of light-filters, and means operative jointly with said plate-moving means for moving said filter-carrier to bring said light-filters successively into the camera-axis.

5. In a camera, a housing carrying a lens and shutter mechanism, a plate magazine having a compartment for a series of superposed unexposed plates, said magazine being removably associated with said housing, means for holding said magazine in position at the rear end of said housing, the forward end of said compartment being open, a mask for closing the open end of said compartment, a plate support mounted in said housing ahead of the plane of said mask, yielding means for urging said plates forwardly toward said mask and plate support, releasable mechanism for holding said plates rearwardly away from said mask, and means for preventing release of said mechanism when said mask is in place.

6. In a camera, a housing carrying a lens and shutter mechanism, a plate magazine having a compartment for a series of superposed unexposed plates, said magazine being removably associated with said housing, means for holding said magazine in position at the rear end of said housing, the forward end of said compartment being open, a mask for closing the open end of said compartment, a plate support mounted in said housing ahead of the plane of said mask, yielding means for urging said plates forwardly toward said mask and plate support, and releasable mechanism for holding said plates rearwardly away from said mask.

7. In a camera, a housing, a support in which said housing is pivotally adjustable, a plate support in said housing, mechanism within said housing for moving photographic plates successively into and out of association with said support, a driving motor for said plate-moving mechanism mounted on said housing-support, and power-transmission means operatively interconnecting said motor and plate-moving mechanism, said power-transmission means including a rotatable element co-axial with the pivotal mounting of said housing in its support.

8. In a camera, means for successively moving a series of photographic plates into and out of exposure position in the focal plane of the camera, means for successively moving a series of light-filters into and out of position on the axis of the camera, and power-transmission mechanism including variable-speed gearing operatively interconnecting said two means and selectively controllable to vary the speed ratio between said two means.

9. In a camera, a support for holding a photographic plate in exposure position, and means for successively moving a series of photographic plates into and out of association with said support, said means comprising a pair of endless chains arranged on opposite sides of said support and provided with outwardly projecting, plate-engaging lugs, each of said lugs having a finger engageable with the rear edge of the plate and, in advance of such finger, an inwardly and forwardly sloping cam surface disposed to engage the rear edge of a plate on said support and move it perpendicularly to its plane out of contact with the support.

10. The invention set forth in claim 9 with the addition of stationary guide means positioned to carry the front edge of such plate away from the plane of said support as the plate begins to move with said chains.

VERNON L. HOWARD.